United States Patent [19]
Meschkat et al.

[11] Patent Number: 5,622,406
[45] Date of Patent: Apr. 22, 1997

[54] SEAT CUSHION ADJUSTMENT FOR VEHICLE SEATS

[75] Inventors: Reinhard Meschkat, Ahorn; Hans Rampel, Ahorn-Schorkendorf; Thomas Rodde, Coburg, all of Germany

[73] Assignee: Brose Fahzeugteile GmbH & Co. KG, Coburg, Germany

[21] Appl. No.: 96,556

[22] Filed: Jul. 23, 1993

[30] Foreign Application Priority Data

Jul. 24, 1992 [DE] Germany ............ 42 24 458.7

[51] Int. Cl.$^6$ ........................................ B60N 2/00
[52] U.S. Cl. ............ 297/318; 297/344.1; 248/421; 248/395
[58] Field of Search ............ 297/316–318, 297/322, 340, 344.1, 344.12, 344.13, 344.14, 344.15, 383, 313, 463.1; 248/421, 394, 395, 429

[56] References Cited

U.S. PATENT DOCUMENTS

| | | | |
|---|---|---|---|
| 2,962,084 | 11/1960 | Pickles | 248/394 |
| 4,781,414 | 11/1988 | Persin | 297/313 |
| 5,145,232 | 9/1992 | Dal Monte | 297/313 X |

FOREIGN PATENT DOCUMENTS

| | | | |
|---|---|---|---|
| 2585641 | 2/1987 | France | 297/316 |
| 0460056 | 1/1937 | United Kingdom | 297/313 |

*Primary Examiner*—Milton Nelson, Jr.
*Attorney, Agent, or Firm*—Christie, Parker & Hale, LLP

[57] ABSTRACT

A seat cushion adjustment for vehicle seats, more particularly the seats of motor vehicles, depends on the adjustment path of at least one main adjustment of the seat and serves for adapting the development curve of the seat cushion adjustment individually and ergonomically. The seat cushion adjustment includes a first adjustment for a main adjustment of the vehicle seat within a defined adjustment area, and a second adjustment coupled to the first adjustment for adjusting the seat cushion in dependence on a main adjustment of the vehicle seat. The seat cushion adjustment also includes a separate adjustment coupled to the first or second adjustment for fixing the development curve of the seat cushion adjustment within a restricted adjustment area, whereby the extreme positions of the seat cushion are associated with the extreme positions of at least one main adjustment of the vehicle seat. Configured in this manner, the seat cushion adjustment eliminates the possibility that the predetermined outer adjustment range limits of the seat cushion will be exceeded.

15 Claims, 8 Drawing Sheets

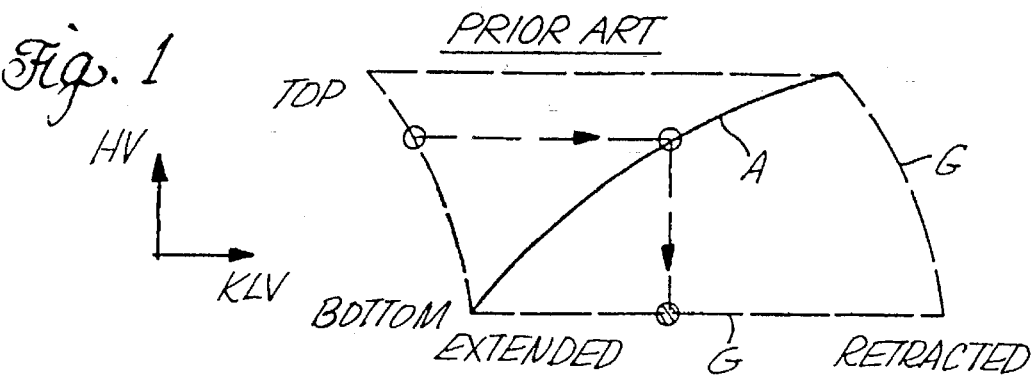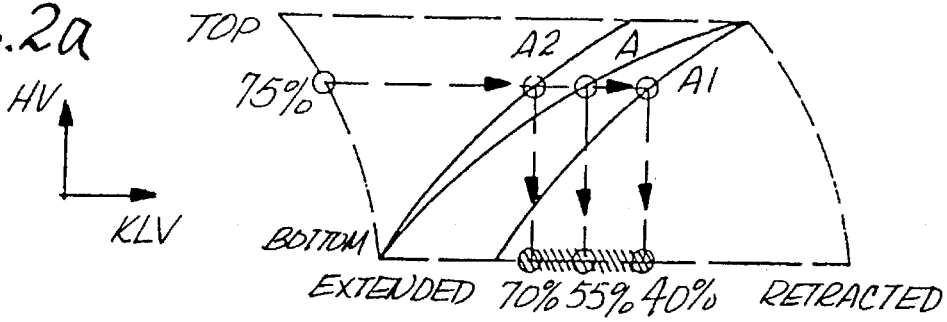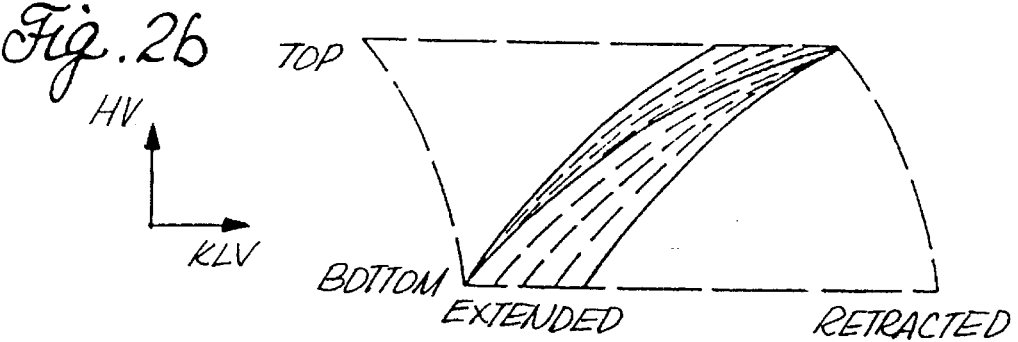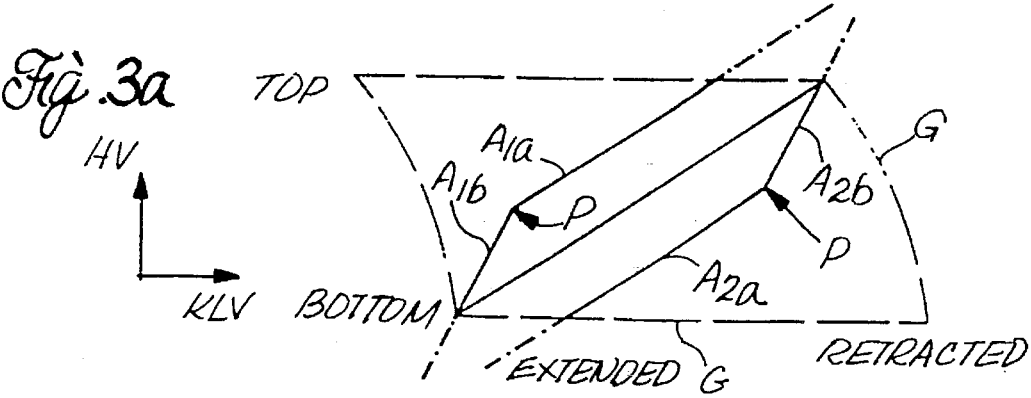

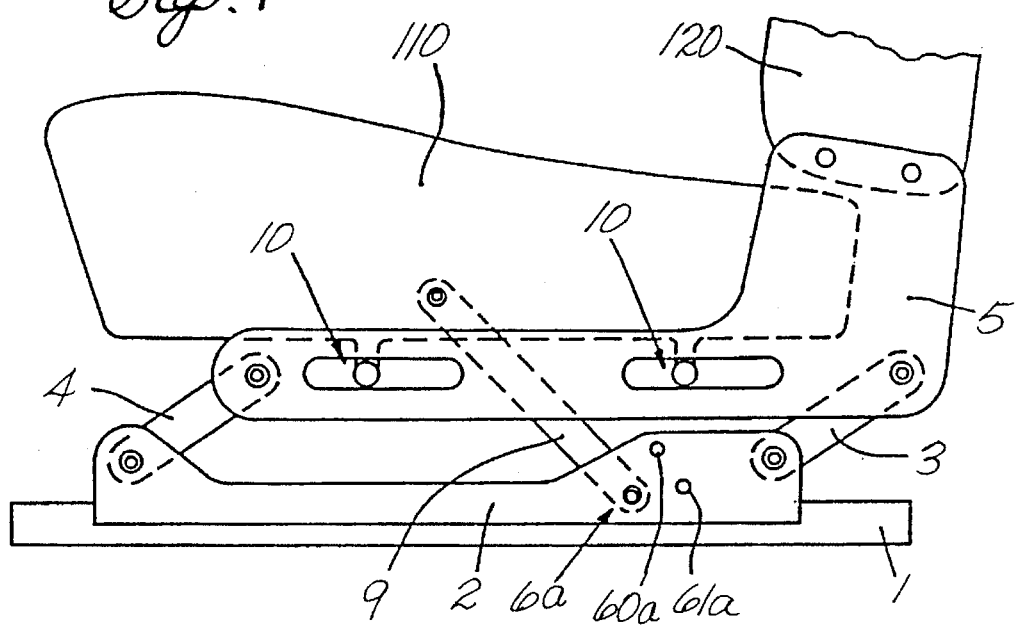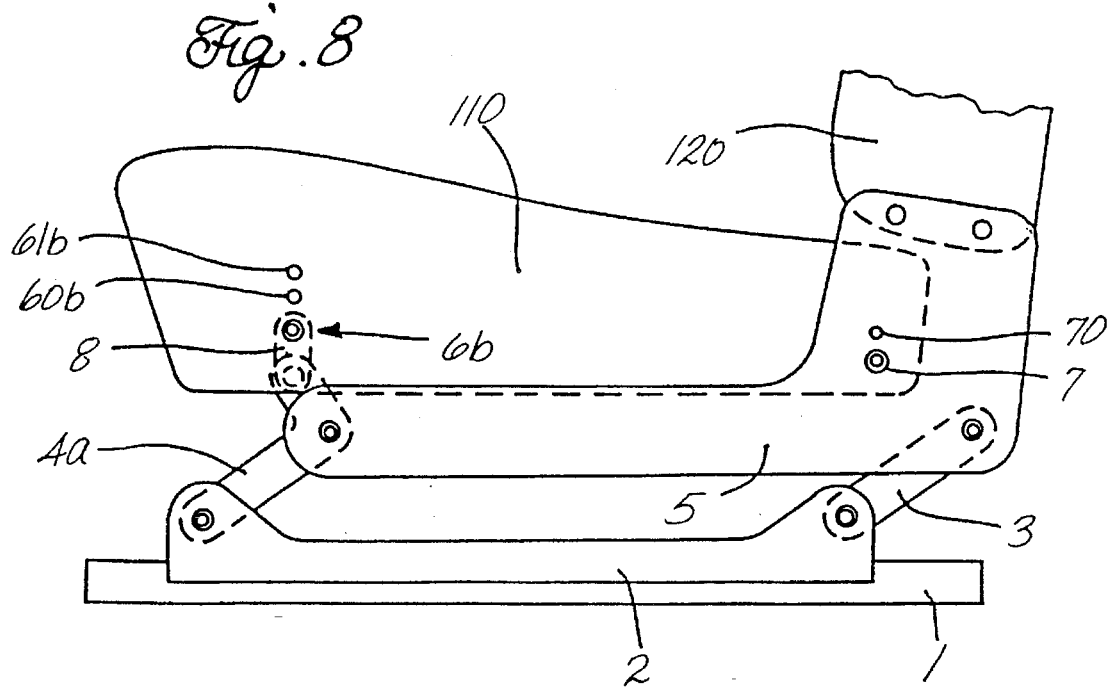

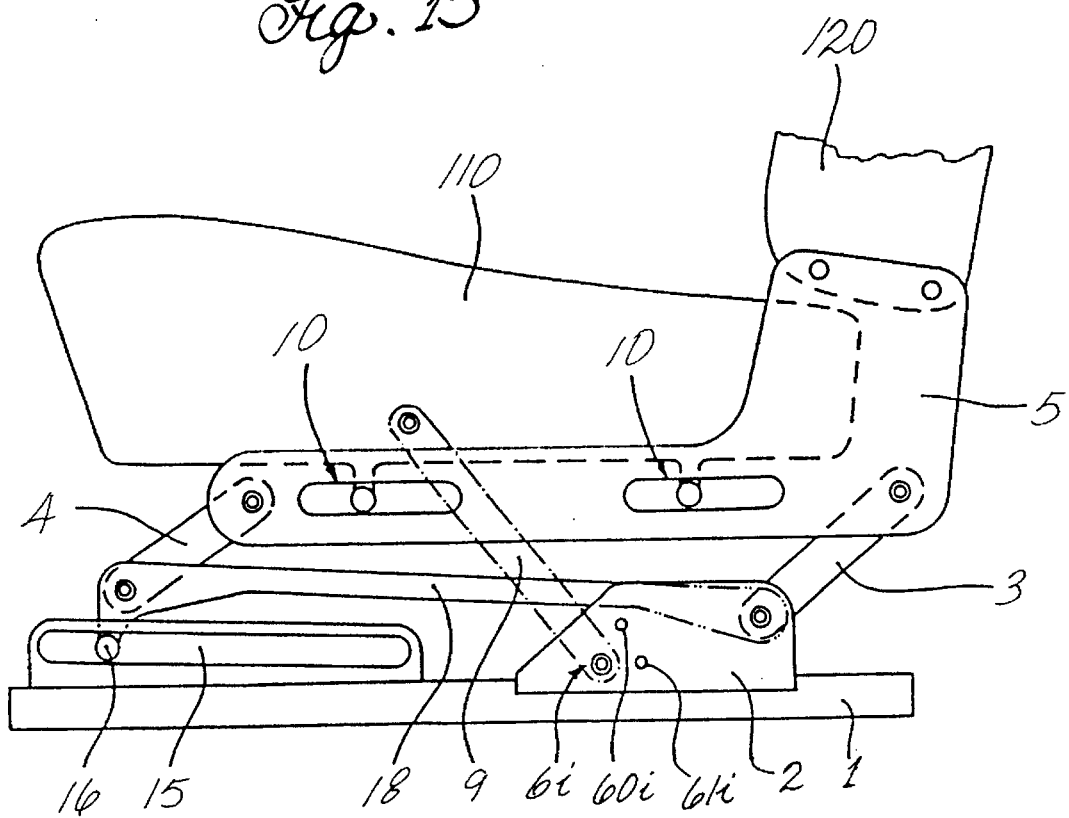

SEAT CUSHION ADJUSTMENT FOR VEHICLE SEATS

BACKGROUND OF THE INVENTION

The invention relates to a seat cushion adjustment for vehicle seats, more particularly for seats of motor vehicles, which depend on the adjustment path of at least one main adjustment of the seat and serves to adapt the development curve of the cushion adjustment individually and ergonomically.

The JP 61-181729 describes a seat cushion adjustment device whose cushion incline adjustment is coupled directly to the adjustment path of the seat height adjustment through a plurality of levers. The development curve of the dependent cushion adjustment is fixed by the arrangement of connecting points between the document levers and the seat frame. A rotary slide joint defines the edges of the adjustment area. As the seat is raised, a swivel movement of the displaceably mounted front part of the seat cushion is initiated at the same time whereby its incline is increased. Similarly lowering the seat leads to a reduction in the incline of the cushion.

The disadvantage of the solution described is that people whose physique differs from the standards used in the design of the seat often find it difficult to find an ideal or comfortable sitting position. This is particularly desirable however where a long journey leads to body fatigue.

SUMMARY OF THE INVENTION

The object of the invention is to develop a seat cushion adjustment which is controlled in dependence on the adjustment path of at least one main adjustment and whose development curve can moreover be adapted within a restricted adjustment area to the individual requirements. A simple easily handled adjustment of several conforming seat parameters prevents the onset of fatigue and relax the person.

According to the invention, a seat cushion adjustment for a vehicle seat comprises first adjustment means for a main adjustment of the vehicle seat within a defined adjustment area, second adjustment means coupled to said first adjustment means for adjusting the seat cushion in dependence on a main adjustment of the vehicle seat whereby said first and second adjustment means define a development curve of the seat cushion adjustment, and separate adjustment means coupled to said first or second adjustment means for fixing the development curve of the seat cushion adjustment within a restricted adjustment area whereby the extreme positions of the seat cushion are associated with the extreme positions of at least one main adjustment of the vehicle seat.

The invention creates a seat cushion adjustment with a separate adjustment by means of which the development curve can be fixed. The extreme positions of the seat cushion, thus its maximum or minimum incline and its furthest front and furthest back position thereby correspond to the extreme positions of at least a main adjustment, thus the seat length adjustment and/or seat height adjustment. It is thereby ensured that a different fixed development curve of the dependent cushion adjustment does not lead to exceeding the predetermined outer adjustment area limits.

Controlling the seat cushion adjustment in dependence on a main adjustment can be carried out through mechanical gearing, e.g., through a non-uniformly translating coupling gear. To this end the coupling lever which connects the seat cushion adjustment to the main adjustment has an adjustable connecting point. If a push-in connection with discrete push-in points (connecting points) is used then the development curve is likewise fixed discretely, i.e., stepped within the adjustment area.

When using a cam plate or the like for adjustment, an infinite adjustment is possible which likewise fixes the development curve of the seat cushion infinitely inside the adjustment area.

Another variation of the invention proposes the use of a non-uniformly translating gearwheel gearing. The change in the translation ratio can thereby be effected suddenly or continuously. A sudden change can be effected if the adjustment path divided up into areas is brought into engagement with gearwheels having different numbers of teeth, such as explained for example in EP 0 443 745. However a continuous change in the translation ratio can also be used. Here the gearing modulus of the interengaging gearing elements changes continuously. As a rule it is not possible for the gearing elements with this type of teeth to turn more than 360°. An example of this type of gearing is provided by the technical solution according to U.S. Pat. No. 4,998,379.

A separate drive for the seat cushion adjustment which is controlled in dependence on the adjustment path of one or more main adjustments offers the most degrees of freedom. With this practically any dependence on several main adjustments can be provided and it can be used particularly favorably in connection with already existing control electronics. In particular, an electric or electronic control unit for controlling the separate drive might be provided. Preferably, the seat also has a memory unit to make it possible to relocate a desired adjustment setting.

However it must be noted that the advantage of saving a drive unit for the adjustable cushion with this embodiment will not be effective unless one motor drives several adjustments in succession with the interposition of a distributor gear.

Preferably, the seat cushion adjustment is carried out both in length (depth) and in incline. This can be ensured through the separate use of the previously described types of gearing. However a seat cushion incline adjustment dependent on the seat cushion length adjustment can however also be selected by using for example a suitably inclined or curved slide displacement.

The invention thus provides numerous requirements for adapting the development curves of several coupled seat adjustment paths to the individual needs of the user. Setting the different comfortable sitting positions is made much easier and can be reached in a very short time. Thus the seat can be changed when driving practically without diverting the attention from the surrounding traffic.

BRIEF DESCRIPTION OF THE DRAWINGS

The features of the specific embodiments of the best mode contemplated of carrying out the invention are illustrated in the drawings, in which:

FIG. 1 shows the development curve of a cushion length adjustment (KLV) in dependence on the height adjustment (HV as main adjustment) of the seat according to the prior art;

FIG 2a shows the discrete group of development curves of a cushion length adjustment (KLV) with stepped adjustment in dependence on the height adjustment (HV);

FIG. 2b shows the field of the groups of development curves of a cushion length adjustment (KLV) with infinite adjustment in dependence on the height adjustment (HV), FIG. 3a shows a discrete group of development curves of a cushion length adjustment (KLV) with suddenly changing translation ratio and stepped adjustment in dependence on the height adjustment (HV);

FIG. 7 is a diagrammatic illustration of an adjustable vehicle seat wherein the cushion length adjustment (KLV) is coupled to the height adjustment (HV);

FIG 8 is a diagrammatic illustration of an adjustable vehicle seat wherein the cushion incline adjustment (KNV) is coupled to the height adjustment (HV);

FIG. 15 is a diagrammatic illustration of an adjustable vehicle seat wherein the cushion length adjustment (KLV) is dependent on the height adjustment (HV) and the cushion incline adjustment (KNV) is dependent on the length adjustment (LV).

DETAILED DESCRIPTION OF THE SPECIFIC EMBODIMENT

Figure 3B:
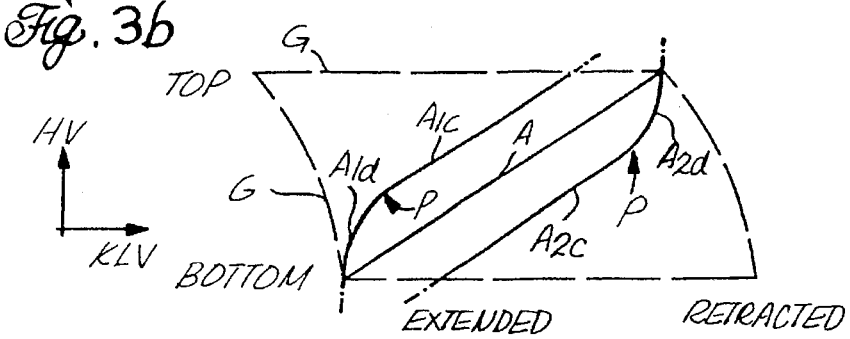
FIG. 3b shows a discrete group of development curves of a cushion length adjustment (KLV) with continuously changing translation ratio and stepped adjustment in dependence on the height adjustment (HV)

First of all the principle of the invention will be explained with reference to the development curves of the seat cushion adjustments which are dependent on one or more main adjustment paths. The illustrated field limits can be thought of as sections of an H-field.

A seat length adjustment (LV) is a length adjustment of the vehicle seat with respect to the vehicle chassis. A seat height adjustment (HV) is a height adjustment of the vehicle seat with respect to the vehicle chassis. A seat cushion length adjustment (KLV) is a length adjustment of the seat cushion with respect to the vehicle seat. A seat cushion incline adjustment (KNV) is an incline adjustment of the seat cushion with respect to the vehicle seat.

FIG. 1 shows a seat cushion length adjustment (KLV) dependent on the height adjustment (HV) as known according to the prior art. A seat cushion length is accurately associated with each seat height through the fixed development curve A inside the boundary G of the adjustment area of the seat cushion. Variations of the parameters of height adjustment HV and cushion length adjustment KLV are not possible.

FIG. 2a shows a group of three development curves A, A1, A2 of a cushion length adjustment KLV in dependence on a height adjustment HV which can be fixed by a stepped adjustment. According to this diagrammatic illustration three seat cushion lengths are associated with one seat height:

With a seat height of about 75% of its maximum value and the setting of the development curve A the seat cushion is extended up to about 55% of its adjustment length. If however the development curves A1 or A2 were chosen then the cushion length adjustment KLV reaches 40% or 70% respectively of its adjustment path. Even with this variation which only provides two further development curves A1, A2 right and left of the usual development curve A the user of the seat is offered a substantially variable adjustment range. The development curves A1 and A2 supply in principle different adjustment characteristics of the seat. Thus the development curve A1 is found more acceptable by a driver with shorter than average legs whilst a user with particularly long legs will select development curve A2.

FIG. 2b shows a field of groups of development curves of a cushion length adjustment KLV which can be used by means of an indefinitely variable adjustment in dependence on the height adjustment HV. Practically any point can be set here within the adjustment area.

Whereas the development curves explained hitherto are the result of coupling levers and thus of non-uniformly translating gearing the group of development curves shown in FIG. 3a of a cushion length adjustment KLV is produced by an adjustment which is indeed likewise dependent on a height adjustment but which has available at least one area with uniform translation ratio. So as not to exceed the limits G of the adjustment area the development curves $A_{1a}$, and $A_{2a}$ have a suddenly changed rise which runs into the area $A_{1b}$ and $A_{2b}$. These development curves are technically convertible through a suddenly changed translation ratio of a gear rod gear.

FIG. 3b shows similar conditions to FIG. 3a. However the continual translation ratio of the development curves $A_{1c}$ and $A_{2c}$ changes continuously into the constantly changing translation ratio of the development curve sections $A_{1d}$ and $A_{2d}$.

Setting one or other development curves right or left of the development curve A is carried out by changing the relative position of the gearbox parts in respect of each other.

Figure 4:
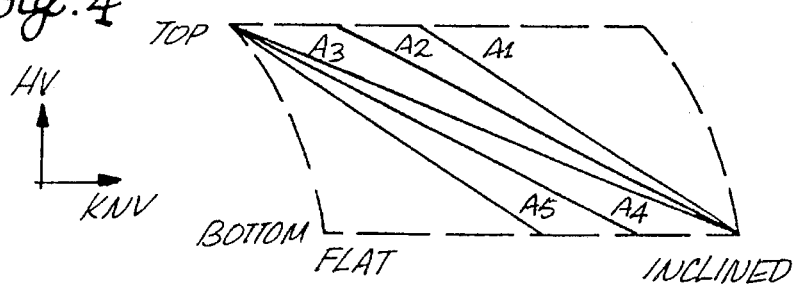
FIG. 4 shows a group of discrete development curves of a cushion incline adjustment (KNV) in dependence on a height adjustment (HV) with direct adjustment.

According to the diagrammatic illustration of FIG. 4 the cushion incline adjustment KNV depends on the height adjustment HV. The stepped adjustment allows the fixing of overall 5 different development curves A1, A2, A3, A4, A5 of which each two lie right and left of the main development curve $A_3$. The automatic coupling of the seat cushion incline is carried out so that it occupies its flattest position at maximum height of the seat and its greatest incline at the minimum height of the seat.

Whereas for example when selecting the outermost right hand development curve $A_1$ in the uppermost seat position a minimum of about 50% of the possible cushion incline is reached, the seat cushion incline according to the development curve $A_5$ in the lowermost seat position still has about half its value.

Figure 5:
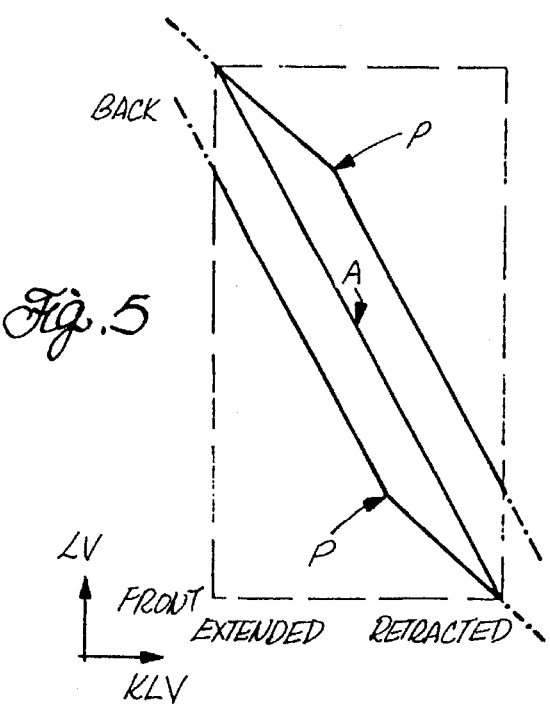
FIG. 5 shows a group of discrete development curves of a cushion length adjustment (KLV) in dependence on the length adjustment (LV) with stepped adjustment and suddenly changing translation ratio.
Figure 6:
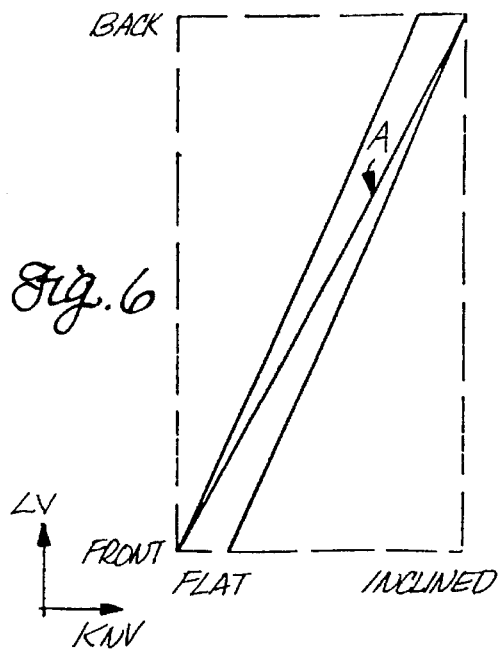
FIG. 6 shows a group of discrete constantly running development curves of a cushion incline adjustment (KNV) in dependence on the length adjustment (LV) with sudden adjustable adjustment.

FIGS. 5 and 6 show development curves for the longitudinal and incline adjustments, respectively of the cushion which are dependent on the main adjustment path of the seat length adjustment.

Whereas the lateral development curves of the seat cushion length adjustment (FIG. 5) are characterized by a suddenly altered translation ratio at point P, the development curves of the cushion incline adjustment (FIG. 6) have a continuous steady course. Both figures show a discrete group of three development curves whose individual preselection can be carried out through stepped adjustment.

Development curves of multi-dependent seat adjustments, i.e., seat adjustments wherein either two dependent adjustment paths are controlled by a main adjustment or wherein two main adjustment paths control one dependent or even several dependent seat parameters were not shown on account of their costly design. Examples for technical conversions here are however given below. (See FIGS. 13 to 15).

FIG. 7 diagrammatically shows an adjustable vehicle seat in side view. It is fixed on a top rail 2 which is in sliding engagement with the lower rail 1. The seat side part 5 and the top rail 2 are connected together by levers 3, 4 and form a parallelogram guide. The seat back 120 of the vehicle seat is connected to the side part 5. It is adjustable by means not shown in the figures. The seat cushion 110 is mounted displaceable in two slide guides 10. The coupling lever 9 provides between the seat cushion and the top rail a connection which causes automatic adjustment of the cushion length in dependence on the adjustment in height. The seat cushion reaches its maximum length in the lowermost seat position where the seat at the same time swivels slightly backwards. The illustrated position of the adjustment point 6a corresponds to the normal position of the seat cushion with a fully available adjustment path, as is also available according to the development curve A of FIG. 2a. If the coupling lever 9 is adjusted at the connecting point 61a then the seat cushion is located in a set-back (rear) position with shortened adjustment path whose development curve is characterized in FIG. 2a by A1. The development curve A2 is achieved by adjusting the coupling lever at the attachment point 60a. The seat cushion is now located in a pushed-forward position with a likewise shortened adjustment path. The attachment points 6a, 60a, 61a are used alternatively for permanent connection. The embodiment has a seat cushion adjustment where the development curve is fixed in steps.

A further variation of the invention is shown in FIG. 8. Similarly, this is a parallelogram adjustment but the lever 4a is designed as an elbow lever with a compensating lever 8 attached to the top end. The other end of the compensating lever 8 is adjusted in the attachment point 6b in the front area of the seat cushion. The device according to the invention hereby guarantees an automatic coupling of the cushion incline adjustment KNV with the seat height adjustment HV. The remaining attachment points 60b, 61b, like the attachment points in the rear area of the seat cushion 7, 70, allow the movement path of the automatic adjustment of the seat to be adapted individually to different requirements. The development curve is fixed in steps according to the respective attachment points.

Figure 9:
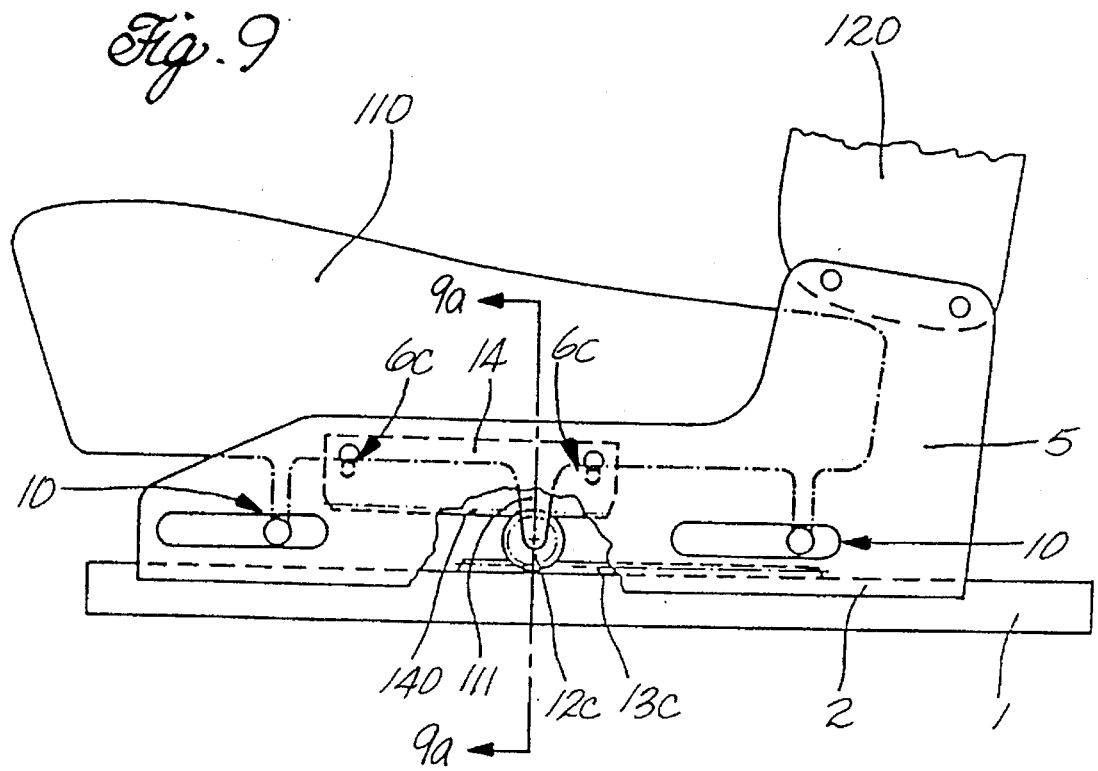
FIG. 9 is a diagrammatic view of an adjustable vehicle seat wherein the cushion length adjustment (KLV) is coupled to the length adjustment (LV)
Figure 9A:
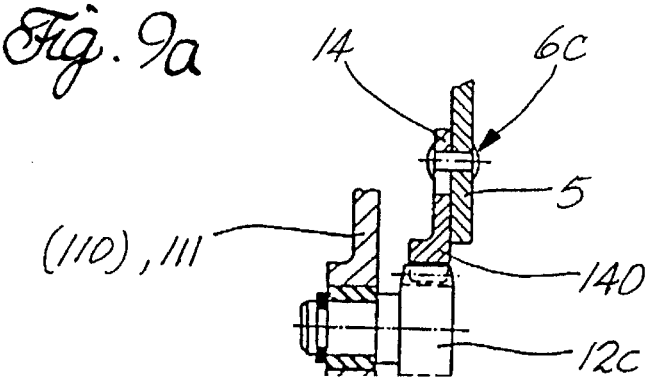
FIG. 9a is a section through the coupling gear according to FIG. 9.

FIG. 9 shows a variation of the invention which brings about the coupling of different seat adjustment paths not by levers but by a toothed rod pinion gear. According to this a toothed rod 13c is mounted in the adjustment area of the seat where it is connected to the lower rail 1 and engages the pinion 12c. At the same time this pinion 12c meshes with the toothed rod 140 which is molded on the adjustment plate 14. The pinion 12c is mounted on the entrainment dog 111 which angles off from the trough of the seat cushion 110. The adjustment plate 14 can be raised by the oblong guides 6c and displaced relative to the remaining gear parts 12c, 13c. Fixing the development curve and adapting the cushion length adjustment KLV are thereby carried out in dependence on the length adjustment LV of the seat. FIG. 9a shows a sectional view clarifying the gear area.

When operating the seat length adjustment the described kinematics causes a relative movement between the seat side part 5 and the seat cushion 110 guided in the slide guides 10. Since one and the same pinion 12c engages the two toothed rods 13c and 140 the translation ratio amounts to 1:2, i.e., when the seat is moved back by 2 cm then the seat cushion 110 is displaced forward relative to the seat side part 5 by 1 cm. Moving the seat forward produces a corresponding relative movement of the seat cushion 110 in the opposite direction.

Figure 10:
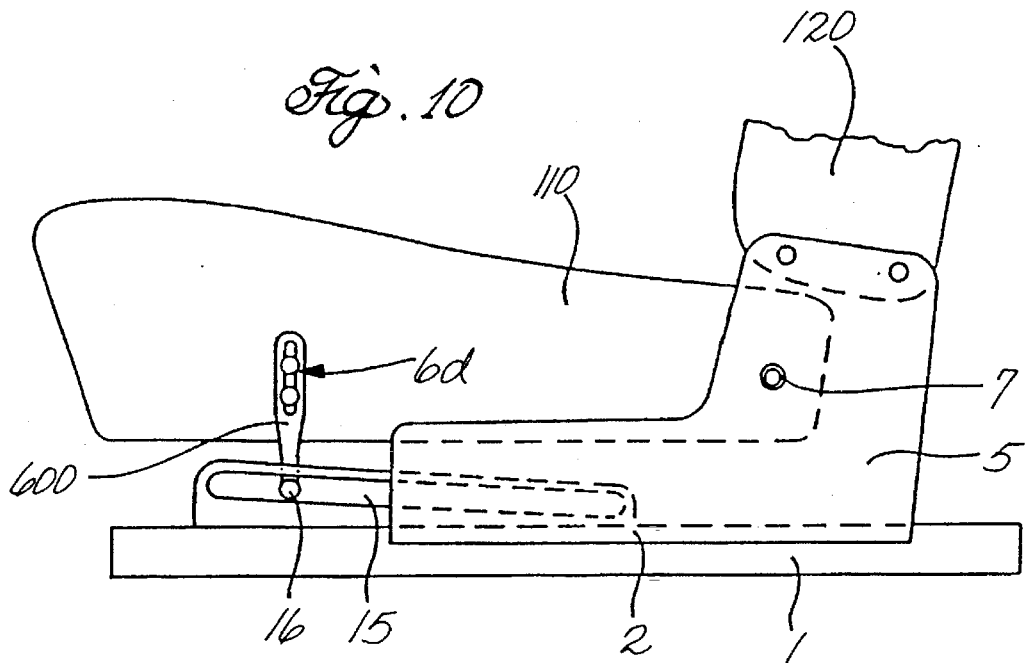
FIG. 10 is a diagrammatic view of an adjustable vehicle seat wherein the cushion incline adjustment (KNV) is coupled to the length adjustment (LV)

FIG. 10 shows how it is easy to produce dependence between the seat cushion incline adjustment KNV and the seat length adjustment LV. A support 600 is displaceably adjusted in the front seat area. At its lower end the support has a slide stone 16 which engages the slide channel 15. At its rear area the seat cushion 110 is rotatably connected by attachment 7 to the seat side part 5 so that the seat cushion 110 can pivot upon the axis of attachment 7. The adjustment means 6d designed as an oblong hole guide allows the incline of the seat cushion to be easily adapted to the longitudinal adjustment of the seat, The development curve of the seat cushion incline adjustment means is fixed in dependence on the adjustment 6d of the support 600.

Figure 11:
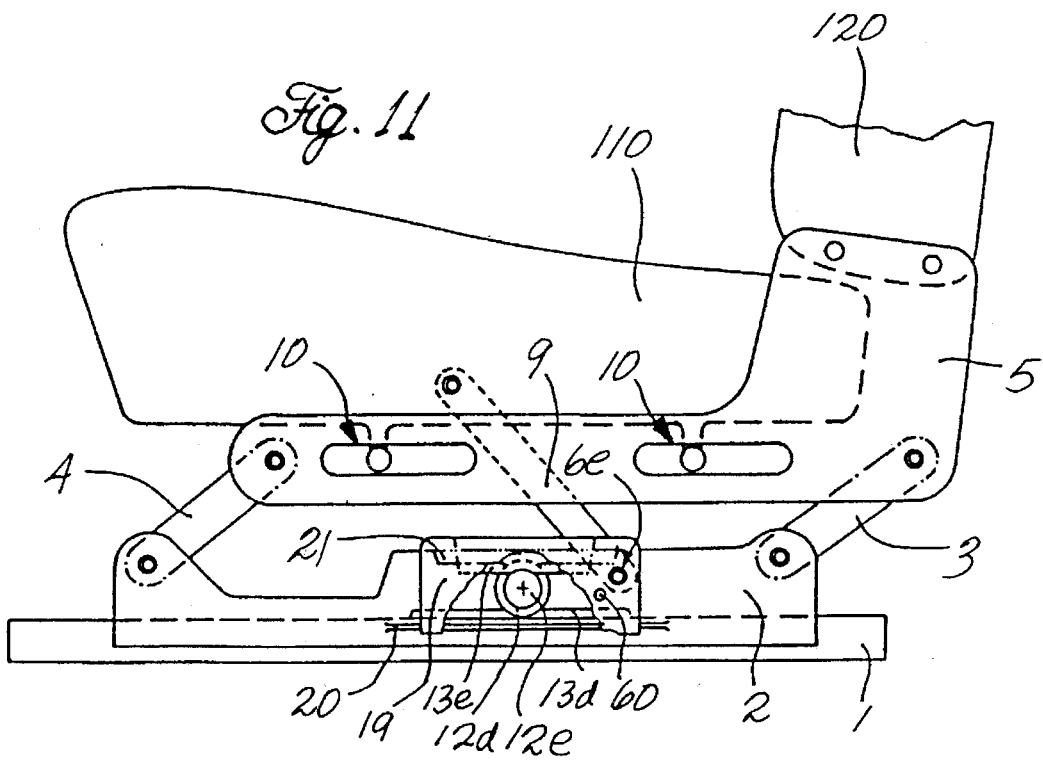
FIG. 11 is a diagrammatic view of an adjustable vehicle seat wherein the cushion length adjustment (KLV) is coupled by multiple coupling to the height adjustment (HV) and length adjustment (LV)

The modified embodiment according to the invention shown in FIG. 11 has a multiple coupling between the seat cushion length adjustment and the height and length adjustment of the seat.

This variation substantially represents a combination of the coupling and adjustment principles according to FIG. 7 and FIG. 9 wherein the lower end of the coupling lever 9 is rotatably attached to a support 19 guided with sliding movement along a channel 20 located on the top rail. A further adjustment point 60 which changes the development curve is provided next to the adjustment point 6e. Furthermore a toothed rod 21 which is likewise connected to the top rail engages the pinion which is realized as a two-phase pinion consisting of a larger pinion 12d and a smaller pinion 12e. The rod 21 meshes with the larger pinion 12d which engages at the same time with the opposed toothed rod 13d. The smaller pinion 12e however, meshes with a toothed rod 13e attached to the top edge of the displaceable support 19.

A translation of the relative movement takes place in a ratio less than 1:2 corresponding to the diameter ratio of the pinions 12d, 12e. I.e., as the seat moves in one direction so the support, and also via the coupling rod 9 the seat cushion 110, moves in the other direction with a smaller amount corresponding to the translation ratio. The two-phase pinon 12d, 12e thereby rolls on the toothed rods 13d, 21, 13e. The pinion 12d, 12e is guided axially in an analogous way to the arm guide shown in FIG. 14.

The cushion length adjustment KLV dependent on the height adjustment HV takes place in the same way as the variation described in FIG. 7.

Figure 12:
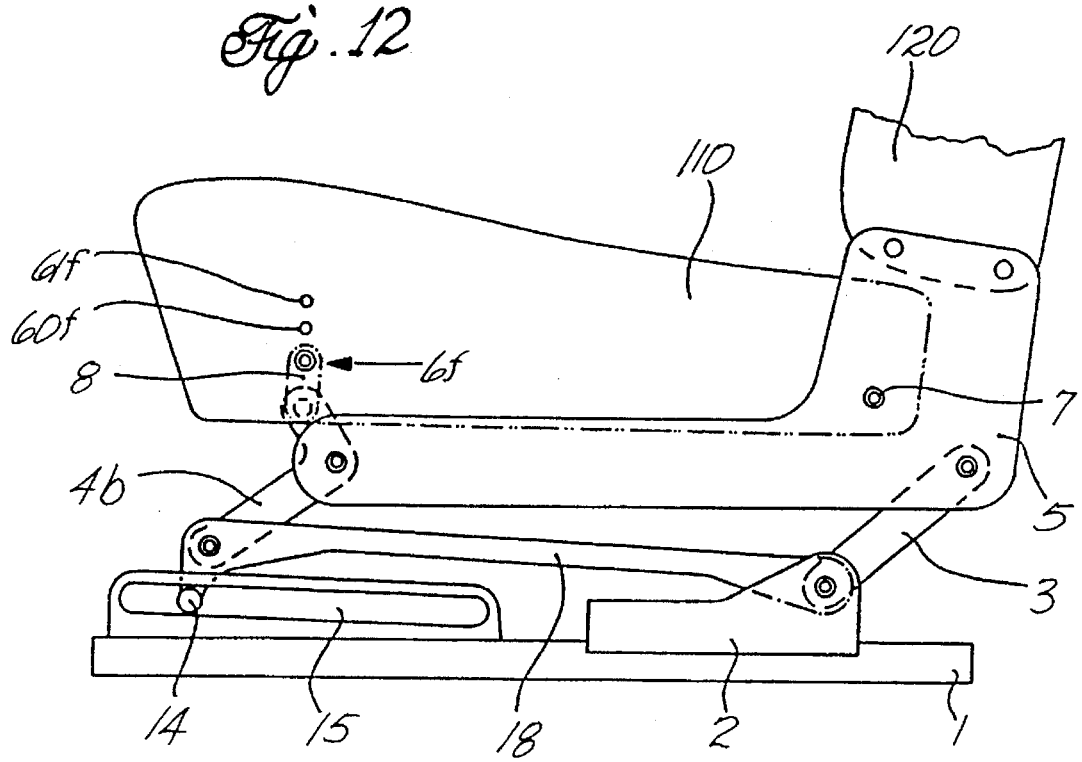
FIG. 12 is a diagrammatic view of an adjustable vehicle seat wherein the cushion incline adjustment (KNV) is coupled by a multiple coupling to the height adjustment (HV) and length adjustment (LV)

FIG. 12. shows diagrammatically a vehicle seat with a multiple coupling of the dependent adjustment path. Its cushion incline adjustment KNV is coupled both to the height adjustment HV and to the length adjustment LV. Whilst the coupling of the seat cushion incline with the height adjustment takes place similar to FIG. 8, the length adjustment of the seat controls the seat cushion incline via the slide channel 15 in which is guided the slide stone 14 of the elbow lever 4. The incline of the entire seat superstructure comprising both the seat cushion 110 and side frame 5 is thereby affected.

Since the elbow lever 4b in the front seat area is not, like the lever 3, attached locally fixed on the top rail 2 the levers 3, 4b are connected together for articulated movement through the coupling rod 18 in order to ensure the parallelogram guide. The compensating lever 8 connects the free end of the elbow lever 4b selectively to the adjustment spots 6f, 60f, 61f.

Figure 13:
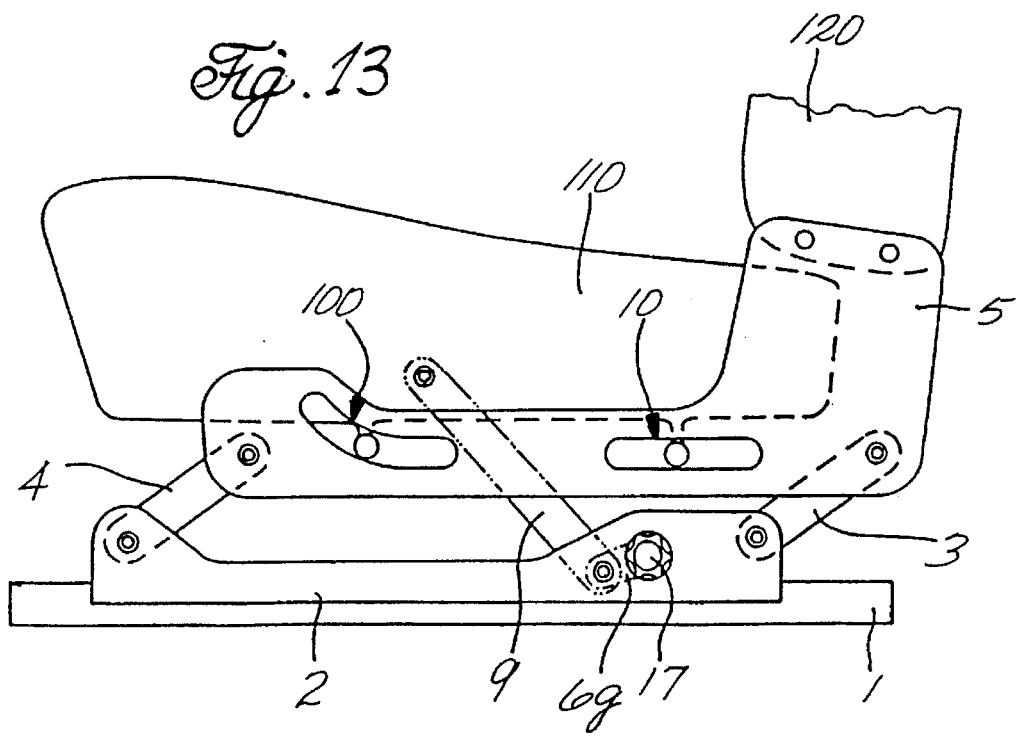
FIG. 13 is a diagrammatic view of an adjustable vehicle seat wherein the cushion length adjustment (KLV) and the cushion incline adjustment (KNV) are coupled simultaneously to the height adjustment (HV)

The technical design according to FIG. 13 likewise produces a multiple coupling of the seat adjustment paths but here the dependence is of two secondary adjustment paths (cushion length adjustment and cushion incline adjustment) on a main adjustment path (height adjustment). The technical basis for this variation is very similar to that of FIG. 7. In order to adjust the coupling lever 9 there are not two different (discrete) attachment points but one continuously adjustable crank-like adjustment device 6g which can be operated by a hand wheel 17 (infinite adjustment). As a result of this a continuous area of development curves is obtained, as shown diagrammatically in FIG. 2b. A measured cushion incline adjustment is reached at the same time in addition to the cushion depth adjustment through the curve-like design of the front slide guide 100.

Figure 14:
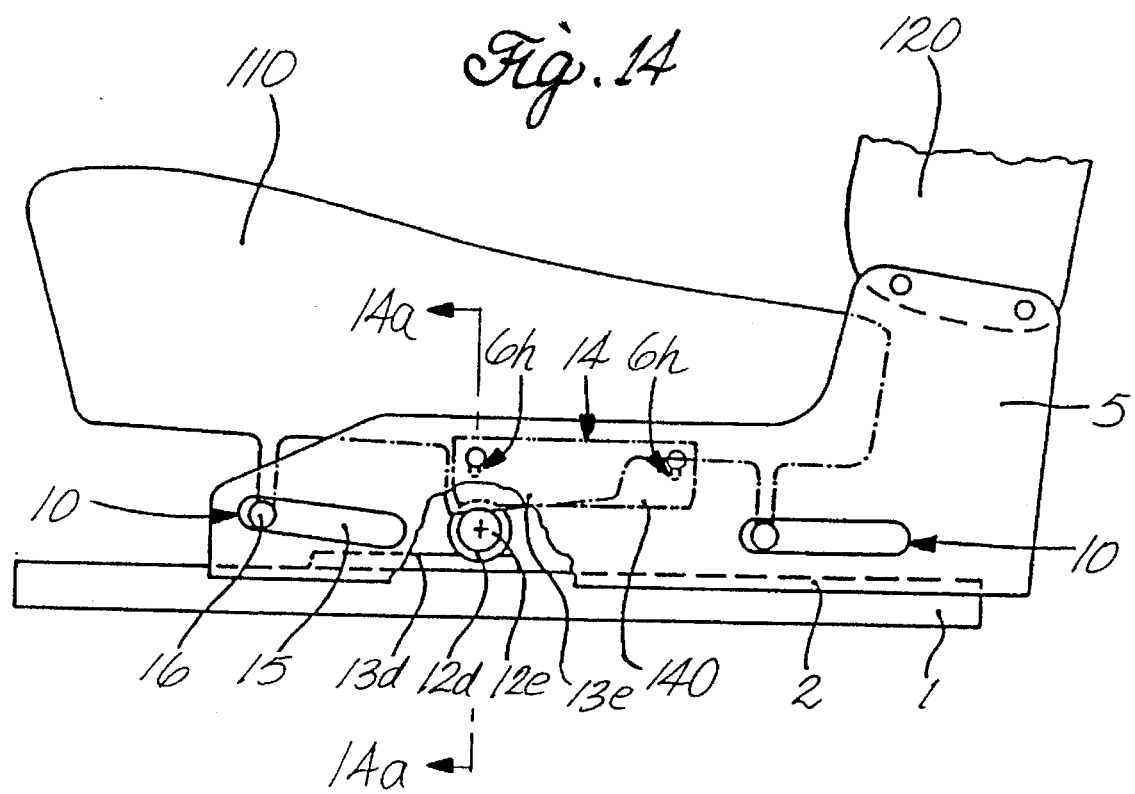
FIG. 14 is a diagrammatic view of an adjustable vehicle seat wherein the cushion length adjustment (KLV) and the cushion incline adjustment (KNV) are coupled simultaneously to the length adjustment (LV)

The modified embodiment according to FIG. 14 shows a seat adjustment kinematics whose cushion length adjustment KLV and cushion incline adjustment KHV are dependent on the length adjustment KV of the seat. For this the larger of the two-phase pinions 12d, 12e rolls down on the toothed rod 13d (connected with the lower rail) and the toothed rod 140 (molded on the adjustment plate 14). The adjustment plate 14 is fixed on the seat side part 5 which in turn is connected to the top rail 2. The toothed rod 13e which is connected to the seat trough of the seat cushion 110 meshes with the smaller pinion 12e. It is mounted in relation to the seat rails 1, 2 with a defined reverse incline like the front slide channel 15. This correlation is decisive for the functional reliability of the seat adjustment according to the invention.

When operating the length adjustment the gear wheels 12d, 12e roll freely but are guided axially on the toothed rods 13d, 140, 13e. Owing to the difference in diameter between the gearwheels 12d, 12e a stabilizing effect of the seat cushion 110 takes place at the same time relative to the seat side part 5 which in proportion to the amount of the length adjustment is smaller than 1:2.

This can mean for example that a forward movement of the seat frame by 10 cm has a reaction of a reverse movement of the seat cushion 110 by 2 cm whereby the front edge of the seat cushion 110 actually only carries out a movement of 8 cm relative to the floor of the vehicle.

Figure 14A:
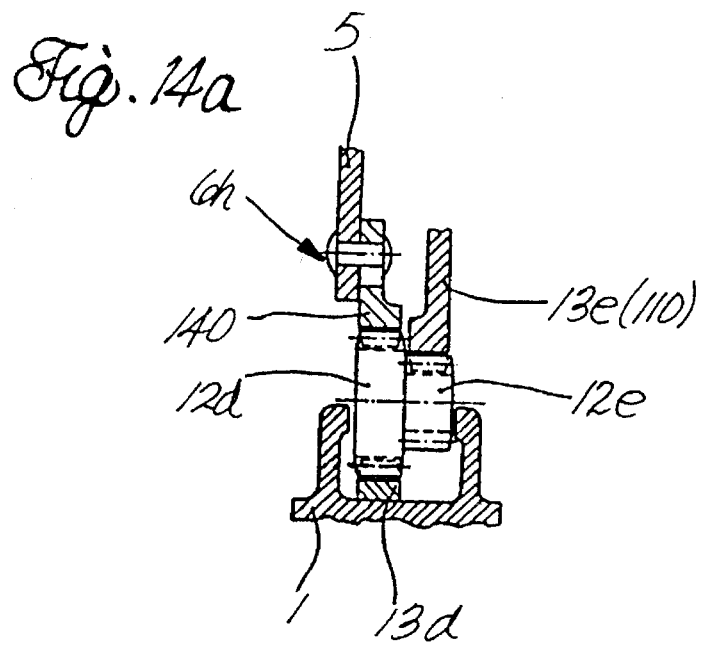
FIG. 14a is a section through the coupling gear according to FIG. 14.

FIG. 14a shows diagrammatically a cross-section through the gear area of the previously described seat adjustment. According to this the lower rail 1 has two upwardly projecting arms which form a U-shaped cross-section to guide the freely rolling pinions 12d, 12e.

The cushion length adjustment KLV dependent on the height adjustment HV according to the embodiment in FIG. 15 uses the same function principle as explained in FIG. 7. To this was combined a slide guide 15, 16 in the front seat area, as already shown in FIG. 12. By selecting a certain incline of the slide channel 15 or a certain slide form it is also possible to affect the cushion incline during longitudinal displacement of the seat over the seat side part 5.

The top rail 2 guided on the lower rail 1 only extends over a small rear part of the seat. The coupling lever 9 is also attached to the top rail and has various different adjustment points (6i, 60i, 61i).

While the invention has been described in detail with respect to certain preferred embodiments, it should be understood that the invention is not limited to those precise embodiments, and that those embodiments are instead representative examples of the many modifications and variations which would present themselves to those of skill in the art without departing from the scope and spirit of this invention, as defined in the appended claims.

What is claimed is:

1. A seat cushion adjustment device for a vehicle seat having a seat cushion, the vehicle seat cushion adjustment device comprising:

first adjustment means for effecting a main adjustment of the vehicle seat within a defined adjustment area;

second adjustment means coupled to said first adjustment means for adjusting the seat cushion in dependence on the main adjustment of the vehicle seat by action of the first adjustment means, whereby said first and second adjustment means define a development curve of the seat cushion adjustment; and separate adjustment means independent of the first and second adjustment means comprising:

a mechanical gear element; and a coupling lever that is coupled between the mechanical gear element and the seat cushion, whereby maximum adjustment positions of the seat cushion are associated with maximum adjustment positions of said main adjustment of the vehicle seat to avoid exceeding predetermined outer adjustment range limits of the seat cushion adjustment, whereby the development curve of the seat cushion adjustment is fixed steplessly within the restricted adjustment area by adjustment of the separate adjusting means.

2. A seat cushion adjustment device for a vehicle seat having a seat cushion, comprising:

first adjustment means for a main adjustment of the vehicle seat within a defined adjustment area;

second adjustment means coupled to said first adjustment means for adjusting the seat cushion in dependence on the main adjustment of the vehicle seat by action of the first adjustment means, and together defining a development curve of the seat cushion adjustment;

separate adjustment means independent of the first and second adjustment means comprising:

a continuous crank adjustment means; and a coupling lever coupled between the continuous crank adjustment means and the seat cushion for fixing the development curve of the seat cushion adjustment within a restricted adjustment area, whereby maximum adjustment positions of the seat cushion are associated with maximum adjustment positions of the main adjustment of the vehicle seat to avoid exceeding predetermined outer adjustment range limits of the seat cushion adjustment, the separate adjustment means effecting adjustment of the development curve of the seat cushion adjustment steplessly within the restricted adjustment area.

3. The seat cushion adjustment device of claim 2, in which said first adjustment means adjusts the seat height.

4. The seat cushion adjustment device of claim 2, in which said second adjustment means adjusts a longitudinal position of the seat cushion.

5. The seat cushion adjustment device of claim 2, in which said second adjustment means adjusts an incline of the seat cushion.

6. The seat cushion adjustment device of claim 2, in which said second adjustment means simultaneously adjusts a longitudinal position and an incline of the seat cushion.

7. A seat cushion adjustment device for a vehicle seat having a seat cushion, the seat cushion adjustment device comprising:

first adjustment means for a main adjustment of the vehicle seat within a defined adjustment area;

second adjustment means coupled to said first adjustment means for adjusting the seat cushion in dependence on the main adjustment of the vehicle seat by action of the first adjustment means, such coupling between the first and second adjustment means causing said first and second adjustment means to define a development curve of the seat cushion; and separate adjustment means independent of the first and second adjustment means comprising:

a coupling lever having first and second end portions, wherein the first end portion is coupled to the seat cushion; and means for providing an adjustable point of attachment to the second end portion of the coupling lever adjustable independent of the first and second adjustment means for fixing the development curve of the seat cushion within a restricted adjustment area, whereby maximum adjustment positions of the seat cushion are associated with maximum adjustment positions of said main adjustment of the vehicle seat to avoid exceeding predetermined outer adjustment range limits of the seat cushion, whereby the development curve of the seat cushion adjustment is fixed steplessly within the restricted adjustment area.

8. The seat cushion adjustment device of claim 7, in which said first adjustment means adjusts the seat height.

9. The seat cushion adjustment device of claim 7, in which said second adjustment means adjusts a longitudinal position of the seat cushion.

10. The seat cushion adjustment device of claim 7, in which said second adjustment means adjusts an incline of the seat cushion.

11. The seat cushion adjustment device of claim 7, in which said second adjustment means simultaneously adjusts a longitudinal position and an incline of the seat cushion.

12. A seat cushion adjustment device for a vehicle seat, the device comprising:

a pair of top rails slidable disposed on respective bottom rails that are fixedly mounted to a vehicle floor;

a pair of seat side parts disposed above the top rails and mounted to opposite side ends of a vertically positioned vehicle seat back;

a pair of adjustment levers pivotably attached between each top rail and respective seat side part, the adjustment levers providing a main adjustment of the vehicle seat;

a seat cushion slidably mounted in a horizontal position between the seat side parts;

adjustment means for controlling an amount of seat cushion adjustment caused by the main adjustment of the vehicle seat; and a coupling lever independent of the adjustment levers that is interposed between the seat cushion and the adjustment means.

13. The seat cushion adjustment device as recited in claim 12 wherein the seat side parts each include a pair of slots, and the seat cushion includes pins that are disposed within respective slots to facilitate slidable seat cushion movement therein.

14. The seat cushion adjustment device as recited in claim 13 wherein each seat side part includes a first slide guide in the form of a slot having a horizontal opening, and a second slide guide in the form of a slot having an inclined opening to facilitate simultaneous horizontal and incline adjustment of the seat cushion.

15. The seat cushion adjustment device as recited in claim 12 herein the adjustment means comprises:

a gear mechanism disposed within a top rail; and a gear lever interposed between the gear mechanism and one end of the coupling lever.

* * * * *